United States Patent
Shibuno et al.

(10) Patent No.: US 8,542,314 B2
(45) Date of Patent: *Sep. 24, 2013

(54) CAMERA SYSTEM INCLUDING CAMERA BODY AND INTERCHANGEABLE LENS FOR PERFORMING FOCUS CONTROL

(75) Inventors: Koji Shibuno, Osaka (JP); Junji Takahata, Osaka (JP); Mitsuyoshi Okamoto, Osaka (JP); Naotake Kitahira, Osaka (JP)

(73) Assignee: Panasonic Corporation, Osaka (JP)

( * ) Notice: Subject to any disclaimer, the term of this patent is extended or adjusted under 35 U.S.C. 154(b) by 162 days.

This patent is subject to a terminal disclaimer.

(21) Appl. No.: 12/934,716

(22) PCT Filed: Mar. 26, 2009

(86) PCT No.: PCT/JP2009/001348
§ 371 (c)(1),
(2), (4) Date: Dec. 13, 2010

(87) PCT Pub. No.: WO2009/119091
PCT Pub. Date: Oct. 1, 2009

(65) Prior Publication Data
US 2011/0096200 A1 Apr. 28, 2011

(30) Foreign Application Priority Data

Mar. 28, 2008 (JP) .................................. 2008-086079
Mar. 28, 2008 (JP) .................................. 2008-086080
Mar. 28, 2008 (JP) .................................. 2008-086081

(51) Int. Cl.
*H04N 5/232* (2006.01)

(52) U.S. Cl.
USPC ............ 348/345; 348/347; 348/348; 348/356

(58) Field of Classification Search
USPC .................. 348/346, 347, 353, 354, 357, 359; 396/91, 104, 125
See application file for complete search history.

(56) References Cited

U.S. PATENT DOCUMENTS

| | | |
|---|---|---|
| 4,477,167 A | 10/1984 | Ishikawa et al. |
| 4,712,072 A | 12/1987 | Kawanabe |
| 4,792,819 A | 12/1988 | Akashi |

(Continued)

FOREIGN PATENT DOCUMENTS

| | | |
|---|---|---|
| EP | 1351086 | 10/2003 |
| JP | 61-105486 | 5/1986 |

(Continued)

OTHER PUBLICATIONS

International Search Report of PCT Application No. PCT/JP2009/001348 dated Jun. 23, 2009.

*Primary Examiner* — Roberto Velez
*Assistant Examiner* — Abdelaaziz Tissire
(74) *Attorney, Agent, or Firm* — Panasonic Patent Center

(57) ABSTRACT

In a camera system including an interchangeable lens and a camera body, a lens controller performs control to detect a position of a focus lens in synchronous with a predetermined timing received from the camera body, store it in a storage unit, and transmit it to the camera body when receiving a position information request signal for requesting transmission of position information stored in the storage unit. The body controller performs control so that a timing of transmission of the position information request signal does not overlap a timing of transmission of the timing signal.

7 Claims, 12 Drawing Sheets

(56) References Cited

U.S. PATENT DOCUMENTS

| | | | |
|---|---|---|---|
| 5,153,629 | A | 10/1992 | Kaneda |
| 5,604,560 | A | 2/1997 | Kaneda |
| 5,839,002 | A | 11/1998 | Miyake et al. |
| 2003/0189662 | A1 | 10/2003 | Matsuda |
| 2004/0037548 | A1 | 2/2004 | Higuma |
| 2005/0128339 | A1* | 6/2005 | Masuda ................. 348/345 |
| 2006/0140613 | A1 | 6/2006 | Aikawa |
| 2007/0104474 | A1* | 5/2007 | Tamura .................. 396/91 |
| 2007/0133970 | A1 | 6/2007 | Honjo et al. |
| 2007/0269197 | A1* | 11/2007 | Ide et al. ............... 396/125 |
| 2008/0007644 | A1* | 1/2008 | Matsumoto ............. 348/345 |
| 2008/0199170 | A1* | 8/2008 | Shibuno et al. ........ 396/125 |
| 2008/0278618 | A1* | 11/2008 | Matsumoto et al. .... 348/345 |
| 2009/0009633 | A1* | 1/2009 | Suto ..................... 348/241 |
| 2009/0135293 | A1* | 5/2009 | Shikaumi .............. 348/353 |
| 2009/0245777 | A1* | 10/2009 | Shibuno et al. ........ 396/104 |
| 2009/0245778 | A1 | 10/2009 | Shibuno et al. |
| 2010/0060748 | A1 | 3/2010 | Tsuchiya |
| 2010/0103306 | A1 | 4/2010 | Ueda et al. |
| 2010/0110278 | A1* | 5/2010 | Higurashi ............... 348/361 |
| 2012/0076482 | A1* | 3/2012 | Shibuno et al. ........ 396/125 |
| 2013/0057752 | A1* | 3/2013 | Shibuno et al. ........ 348/345 |

FOREIGN PATENT DOCUMENTS

| | | |
|---|---|---|
| JP | 4-273225 | 9/1992 |
| JP | 10-161006 | 6/1998 |
| JP | 11-64956 | 3/1999 |
| JP | 2003-295047 | 10/2003 |
| JP | 2004-64713 | 2/2004 |
| JP | 2005-84339 | 3/2005 |
| JP | 2006-146062 | 6/2006 |
| JP | 2006-184440 | 7/2006 |
| JP | 2006-309407 | 11/2006 |
| JP | 2007-148075 | 6/2007 |
| JP | 2007-322922 | 12/2007 |
| JP | 2008-15274 | 1/2008 |

* cited by examiner

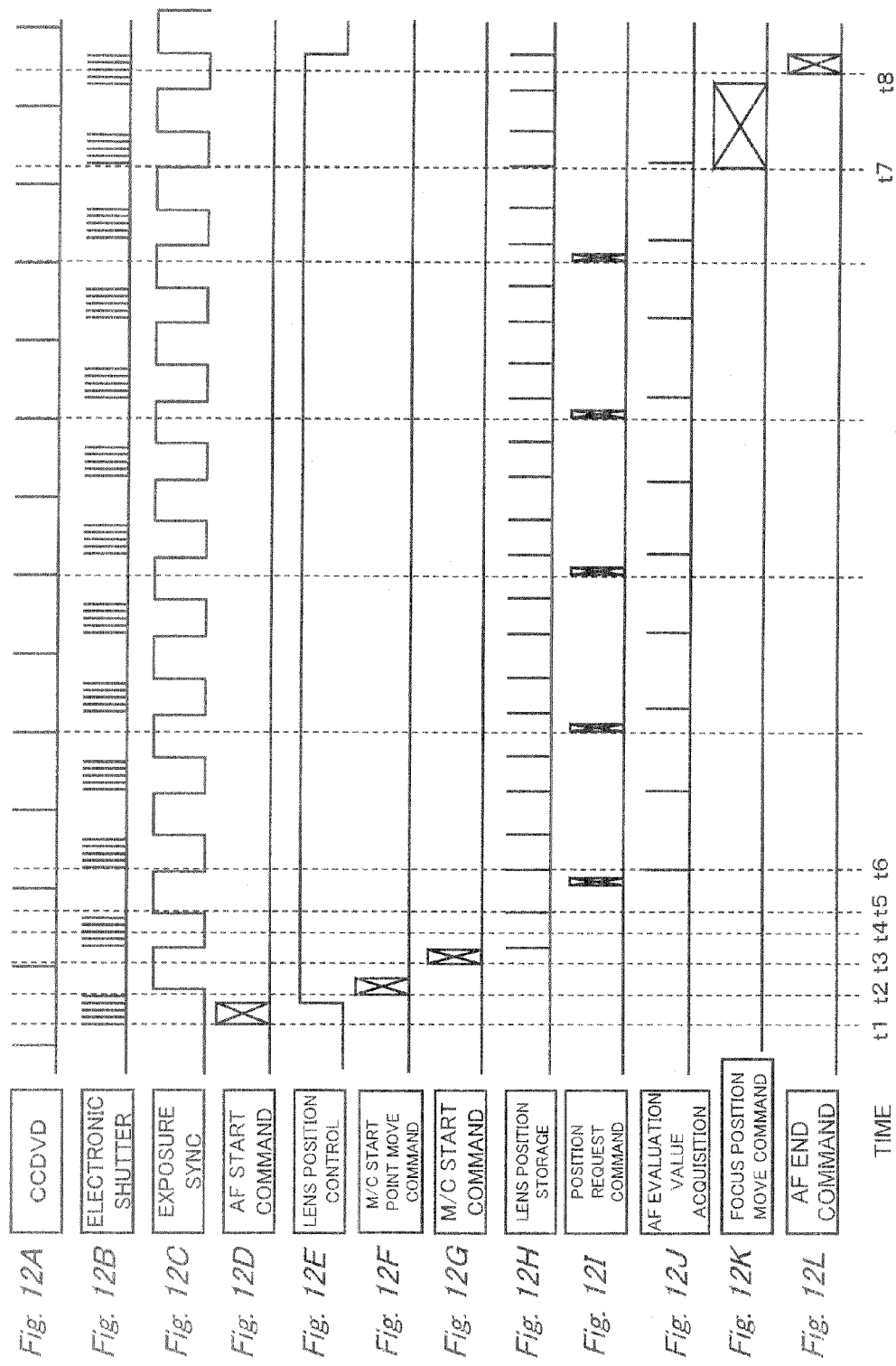

CAMERA SYSTEM INCLUDING CAMERA BODY AND INTERCHANGEABLE LENS FOR PERFORMING FOCUS CONTROL

TECHNICAL FIELD

The present invention relates to a lens-interchangeable camera system, and more particularly to a camera system capable of performing an autofocus operation in a contrast detection method.

BACKGROUND ART

Patent document 1 discloses autofocus control that employs both a phase-difference detection method and a contrast method. An imaging apparatus disclosed in the Patent document 1 corrects focus control information obtained by the phase-difference detection method, based on focus information obtained by the contrast method. Specifically, correction information for compensating for insufficient detection accuracy of the phase-difference detection which has excellent high-speed performance is obtained based on information indicating a focus status obtained by using contrast detection which enables focus determination at high accuracy. This arrangement can provide focus control by the phase-difference detection method with higher speed and higher accuracy compared to the hybrid method, and the like.

Patent Document 1: JP-A-2003-295047

DISCLOSURE OF THE INVENTION

Problem to be Solved by the Invention

As described above, the Patent document 1 discloses an improvement in the focus accuracy of a lens-interchangeable camera system. However, the Patent document 1 discloses an invention for improving the focus accuracy of the phase-difference detection method by correcting focus control information obtained by the phase-difference detection method based on focus information obtained by the contrast method. It does not disclose an improvement in the accuracy of focus information itself that is obtained by the contrast method.

An object of the present invention is to provide a lens-interchangeable camera system having improved accuracy of an autofocus operation in a contrast method.

Solving Means

A camera system according to the present invention includes an interchangeable lens and a camera body. The interchangeable lens includes a focus lens operable to move back and forth in an optical axis direction to change a focus status of a subject image; a driver operable to drive the focus lens; a position detector operable to detect a position of the focus lens; a storage unit operable to store information on the detected position; a position information transmission unit operable to transmit the position information stored in the storage unit to the camera body; and a lens controller operable to control an operation of the interchangeable lens under control of the camera body. The camera body includes an imaging unit operable to image a subject to generate image data; a timing signal transmission unit operable to generate a predetermined timing signal and transmit the timing signal to the interchangeable lens; a drive signal transmission unit operable to generate a drive signal for driving the focus lens and transmit the drive signal to the interchangeable lens; a position information request transmission unit operable to generate a position information request signal for requesting a transmission of position information stored in the storage unit of the interchangeable lens and transmit the position information request signal to the interchangeable lens; and a body controller operable to control an operation of the camera body. The body controller controls the drive signal transmission unit to drive the focus lens in a predetermined direction, and performs control to transmit the timing signal to the interchangeable lens. The lens controller performs control to detect a position of the focus lens in synchronization with the timing signal received from the camera body and store information on the detected position in the storage unit. Further, the lens controller, when receiving the position information request signal from the camera body, performs control to transmit the position information stored in the storage unit to the camera body. The body controller performs control so that a timing of transmission of the position information request signal does not overlap a timing of transmission of the timing signal.

According to camera system having the above-described configuration, a position of the focus lens can be accurately obtained with the focus lens being moved, and thus fast and accurate contrast autofocus operation can be achieved. Further the lens controller does not receive the timing signal and the position information request signal at the same time. As a result, the lens controller can perform a lens position detection process done when receiving the timing signal and so on, exclusively from a process for transmitting lens position information done when receiving the position information request signal.

EFFECT OF THE INVENTION

According to the present invention, in a lens-interchangeable camera system, the accuracy of a contrast autofocus operation can be improved.

BRIEF DESCRIPTION OF DRAWINGS

FIGS. 12A to 12L are timing charts for a contrast AF operation performed by the camera system according to the fourth embodiment of the invention.

DESCRIPTION OF REFERENCE SIGNS 1 camera system
100 camera body
110 CCD image sensor
112 timing generator
130 release button
140 camera controller
150 body mount
200 interchangeable lens
230 focus lens
231 first encoder
232 second encoder
233 focus motor
240 lens controller
250 lens mount Best Modes for Carrying Out the Invention First Embodiment 1-1. Configuration 1-1-1. Overview FIG. 1 is a block diagram showing a configuration of a camera system according to embodiments of the invention. A camera system 1 includes a camera body 100 and an interchangeable lens 200 mountable to the camera body 100. The camera system 1 can perform an autofocus operation in a contrast method, based on image data generated by a CCD image sensor 110.

1-1-2. Configuration of the Camera Body

Figure 1:
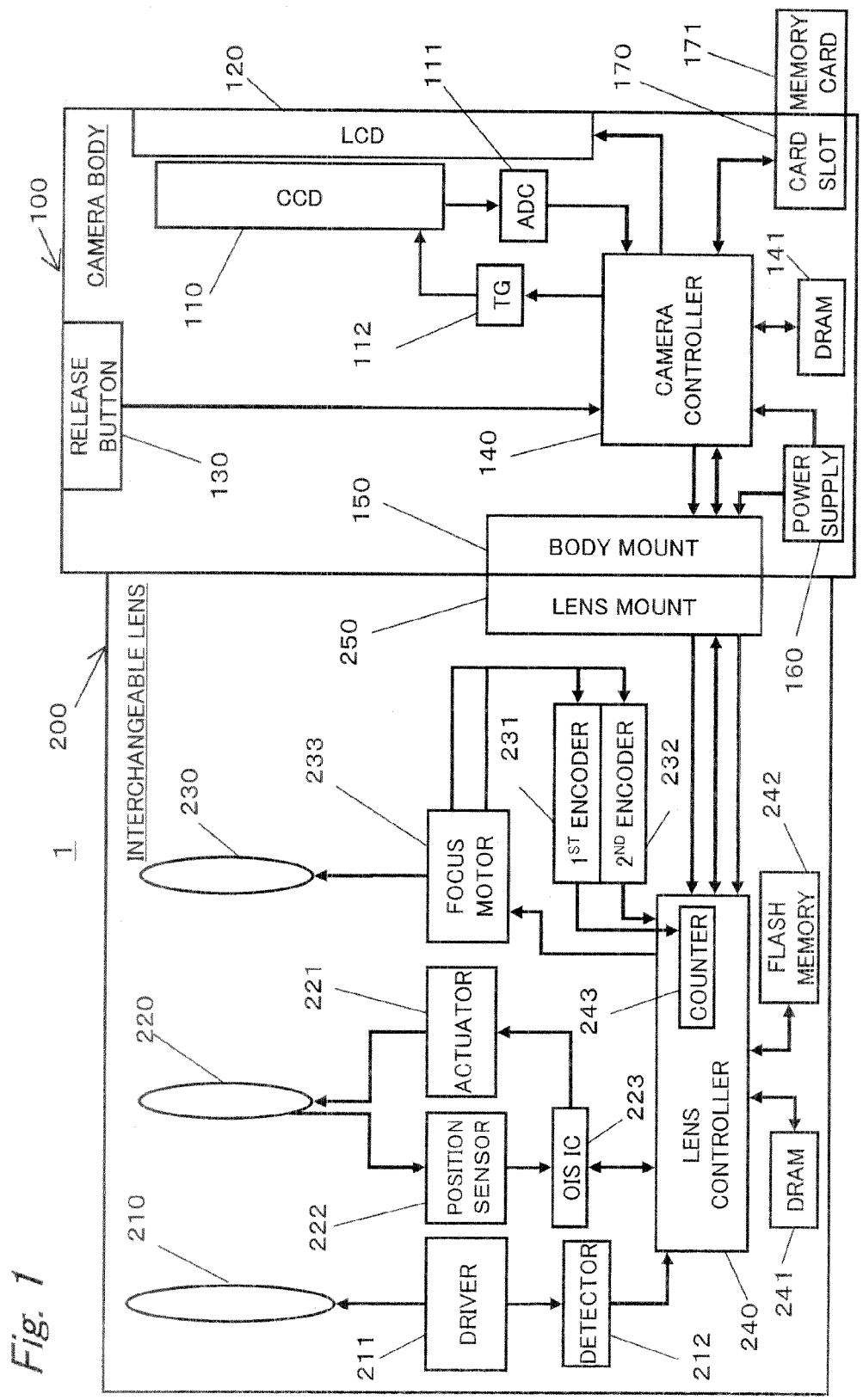
FIG. 1 is a block diagram showing a configuration of a camera system according to embodiments of the invention.

The camera body 100 includes the CCD image sensor 110, a liquid crystal display (LCD) monitor 120, a camera controller 140, a body mount 150, a power supply 160, and a card slot 170.

The camera controller 140 controls the entire operation of the camera system 1 by controlling components such as the CCD image sensor 110 in response to an instruction from operation members such as a release button 130. The camera controller 140 transmits a vertical synchronizing signal to a timing generator 112. In parallel with this, the camera controller 140 generates an exposure synchronizing (sync) signal. The camera controller 140 periodically transmits the generated exposure synchronizing signal to a lens controller 240 through the body mount 150 and a lens mount 250. The camera controller 140 uses a DRAM 141 as a work memory when performing a control operation or image processing operation.

The CCD image sensor 110 images a subject image that enters through the interchangeable lens 200 to generate image data. Specifically, the CCD image sensor 110 is exposed at a predetermined timing to capture a subject image and generate image data. The generated image data is digitized by an AD converter 111. The digitized image data is subjected to predetermined image processing by the camera controller 140. The predetermined image processing includes, for example, a gamma correction process, a white balance correction process, a flaw correction process, a YC conversion process, an electronic zoom process, and a JPEG compression process.

The CCD image sensor 110 operates at timing that is controlled by the timing generator 112. The operations of the CCD image sensor 110 include a still-image capturing operation, a through-the-lens image (hereinafter, referred to as a "through image") capturing operation, and the like. The through image is mainly a moving image and is displayed on the LCD monitor 120 so that a user can determine composition for capturing a still image.

The LCD monitor 120 displays an image represented by display image data that is subjected to image processing by the camera controller 140. The LCD monitor 120 can selectively display both a moving image and a still image.

The card slot 170 allows the memory card 171 to be placed therein, and controls the memory card 171 under control of the camera controller 140. The memory card 171 can store image data generated by image processing by the camera controller 140. The memory card 171 can store, for example, JPEG image files. Image data or an image file stored in the memory card 171 can be read. The image data or image file read from the memory card 171 is subjected to image processing by the camera controller 140. For example, the camera controller 140 decompresses image data or an image file obtained from the memory card 171 to generate display image data.

The power supply 160 supplies power to be consumed by the camera system 1. The power supply 160 may be, for example, a dry battery or rechargeable battery. Alternatively, the power supply 160 may supply power to the camera system 1 from an external source through a power cable.

The body mount 150 can be mechanically and electrically connected to the lens mount 250 of the interchangeable lens 20. The body mount 150 can transmit and receive data with the interchangeable lens 200 through the lens mount 250. The body mount 150 transmits an exposure synchronizing signal received from the camera controller 140 to the lens controller 240 through the lens mount 250. Also, the body mount 150 transmits other control signals received from the camera controller 140, to the lens controller 240 through the lens mount 250. Also, the body mount 150 transmits a signal received from the lens controller 240 through the lens mount 250 to the camera controller 140. Also, the body mount 150 supplies power received from the power supply 160 to the entire interchangeable lens 200 through the lens mount 250.

1-1-3. Configuration of the Interchangeable Lens

The interchangeable lens 200 includes an optical system, the lens controller 240, and the lens mount 250. The optical system includes a zoom lens 210, an OIS lens 220, and a focus lens 230.

The zoom lens 210 is a lens for changing the magnification of a subject image to be formed by the optical system. The zoom lens 210 includes one or a plurality of lenses. A drive mechanism 211 includes a zoom ring or the like that can be operated by a user, and transmits an operation of the user to the zoom lens 210 to cause the zoom lens 210 to move along an optical axis direction of the optical system. A detector 212 detects a moving amount of the drive mechanism 211. The lens controller 240 can grasp a zoom magnification of the optical system by receiving a result of the detection by the detector 212.

The OIS lens 220 is a lens for correcting shake of a subject image to be formed by the optical system of die interchangeable lens 200. The OIS lens 220 moves in a direction to cancel the shake of the camera system 1, thereby reducing shake of a subject image on the CCD image sensor 110. The CIS lens 220 includes one or a plurality of lenses. An actuator 221 drives the OIS lens 220 in a plane vertical to an optical axis of the optical system, under the control of an OIS IC 223. The actuator 221 can be implemented by, for example, a magnet and a planar coil. A position detection sensor 222 is a sensor for detecting a position of the OIS lens 220 in the plane vertical to the optical axis of the optical system. The position detection sensor 222 can be implemented by, for example, a magnet and a Hall element. The OIS IC 223 controls the actuator 221 based on a detection result obtained by the position detection sensor 222 and a detection result obtained by a camera shake detector such as, for example, a gyro sensor. The OIS IC 223 obtains a detection result by the camera shake detector from the lens controller 240. Also, the OIS IC 223 transmits a signal indicating a status of an optical image shake correction process to the lens controller 240.

The focus lens 230 is a lens for changing a focus status of a subject image to be formed on the CCD image sensor 110 through the optical system. The focus lens 230 includes one or a plurality of lenses.

A focus motor 233 drives the focus lens 230 to move back and forth along the optical axis of the optical system under control of the lens controller 240. By this, the focus status of a subject image to be formed on the CCD image sensor 110 through the optical system can be changed. In the present embodiment, as the focus motor 233, a EC motor can be used. Note, however, that the invention is not limited thereto and the focus motor 233 can also be implemented by a stepping motor, a servo motor, an ultrasonic motor, and the like.

A first encoder 231 and a second encoder 232 are encoders that generate a signal indicating a driving status of the focus lens 230. The first encoder 231 and the second encoder 232 can be implemented by, for example, a rotor mounted on a rotating shaft of the focus motor 233 and a photocoupler. The rotor is a disk having holes formed at predetermined intervals. The photocoupler emits a detection light from one side of the rotor and receives the light from the other side. Hence, along with rotation of the rotor, the photocoupler is alternately switched on and off. The lens controller 240 has a counter 243 provided therein. The counter 243 counts the number of times the photocoupler is switched on and off. The phases of the first encoder 231 and the second encoder 232 are shifted from each other. Therefore, a moving direction of the focus lens 230 when the first encoder 231 is switched from off to on can be determined. Specifically, when the first encoder 231 is switched from off to on, the second encoder 232 can have two statuses: on and off. When the first encoder 231 is switched from off to on with the second encoder 232 being on, the counter 243 determines this to be a forward rotation and thus counts up, as "+1". On the other hand, when the first encoder 231 is switched from off to on with the second encoder 232 being off, the counter 243 determines this to be a reverse rotation and thus counts down, as "−1". By thus counting, the lens controller 240 can grasp the amount of movement of the focus lens 230.

The lens controller 240 controls the focus motor 233 in a first control mode or a second control mode. The first control mode is a control mode in which the lens controller 240 cannot detect a reversal of the driving direction of the focus lens 230 based on only a detection result of a position of the focus lens 230 obtained by a position detector. The second control mode is a control mode in which the lens controller 240 can detect a reversal of the driving direction of the focus lens 240 based on only a detection result of the position detector.

Specifically, in the first control mode, the lens controller 240 controls the focus motor 233 using only the first encoder 231. Whether the focus motor 233 rotates forward or backward cannot be determined only by knowing that the first encoder 231 is switched from off to on. Hence, in the first control mode, the lens controller 240 is unable to detect a reversal of the driving direction of the focus lens 230.

On the other hand, in the second control mode, the lens controller 240 controls the focus motor 233 using the first encoder 231 and the second encoder 232. When using the first encoder 231 and the second encoder 232, as described above, whether the focus motor 233 rotates forward or backward when the first encoder 231 is switched from off to on can be determined by the status of the second encoder 232. Hence, in the second control mode, the lens controller 240 can detect a reversal of the drive direction of the focus lens 230.

The lens controller 240 controls the entire interchangeable lens 200 by controlling the OIS IC 223, the focus motor 233, and the like, based on control signals from the camera controller 140. Also, the lens controller 240 receives signals from the detector 212, the OIS IC 223, the first encoder 231, the second encoder 232, and the like, and transmits the signals to the camera controller 140. Transmission and reception of data between the lens controller 240 and the camera controller 140 is performed through the lens mount 250 and the body mount 150. The lens controller 240 uses a DRAM 241 as a work memory when performing control. A flash memory 242 stores programs and parameters to be used for the control by the lens control 240.

1-1-4. Correspondence of Configurations Between the Embodiments and the Invention The focus motor 233 is an example of a driver of the present invention. A configuration including the first encoder 231 and the counter 243 or a configuration including the first encoder 231, the second encoder 232, and the counter 243 is an example of a position detector of the present invention. A configuration including the DRAM 241 or the flash memory 242 is an example of a storage unit of the present invention. A configuration including the lens controller 240 and the lens mount 250 is an example of a position information transmission unit of the present invention. A configuration including the lens controller 240 and the lens mount 250 is an example of a first position detection cancellation unit of the present invention. The lens controller 240 is an example of a lens controller of the present invention. The CCD image sensor 110 is an example of an imaging unit of the present invention. A configuration including the camera controller 140 and the body mount 150 is an example of a timing signal transmission unit of the present invention. A configuration including the camera controller 140 and the body mount 150 is an example of a drive signal transmission unit of the present invention. The camera controller 140 is an example of a body controller of the present invention. A configuration including the camera controller 140 and the body mount 150 is an example of a second position detection cancellation unit of the present invention.

1-2. Operation 1-2-1. Imaging Preparation Operation

Figure 2:
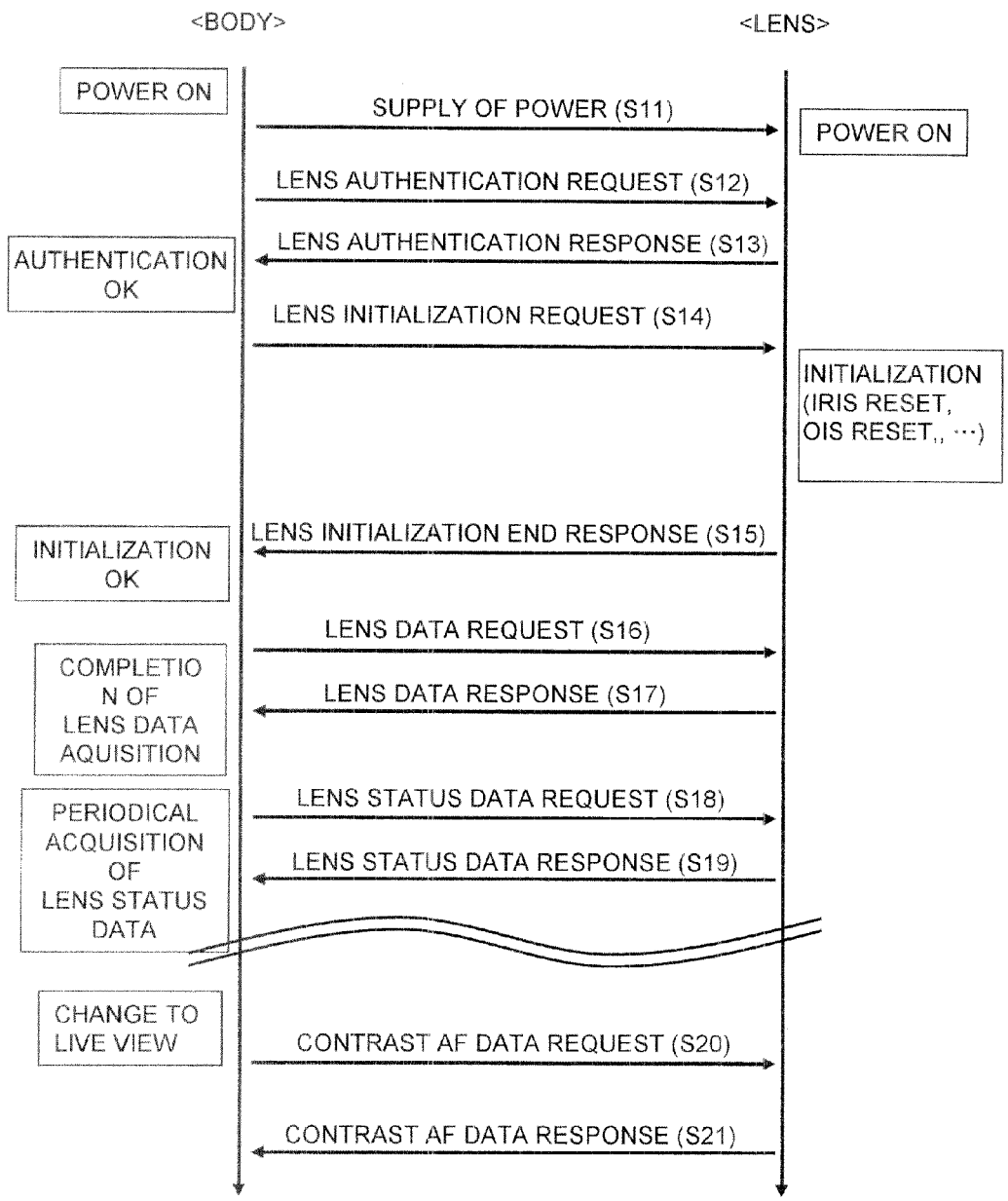
FIG. 2 is an explanatory diagram for describing an imaging preparation operation of the camera system.

First, the operation of the camera system 1 for imaging preparation will be described. FIG. 2 is a diagram showing signal transmission and reception in an imaging preparation operation of the camera system 1.

When a user turns on power to the camera body 100 with the interchangeable lens 200 mounted on the camera body 100, the power supply 160 supplies power to the interchangeable lens 200 through the body mount 150 and the lens mount 250 (S11). Then, the camera controller 140 requests the lens controller 240 for authentication information of the interchangeable lens 200 (S12). The authentication information of the interchangeable lens 200 includes information on whether the interchangeable lens 200 is mounted and information on whether accessories are mounted. The lens controller 240 responds to the lens authentication request from the camera controller 140 (S13).

Then, the camera controller 140 requests the lens controller 240 to perform an initialization operation (S14). In response to this, the lens controller 240 performs an initialization operation, such as reset of an iris and reset of the OIS lens 220. The lens controller 240 then sends a response indicating that the lens initialization operation has been completed to the camera controller 140 (S15).

Then, the camera controller 140 requests the lens controller 240 for lens data (S16). The lens data is stored in the flash memory 242. The lens controller 240 reads the lens data from the flash memory 242 and sends the lens data back to the camera controller 140 (S17). The lens data includes characteristic values specific to the interchangeable lens 200, such as, for example, a lens name, F-number, and a focal length.

When the camera controller 140 grasps the lens data of the interchangeable lens 200 mounted on the camera body 100, the camera system 1 goes into a status capable of imaging. In this status, the camera controller 140 periodically requests the lens controller 240 for lens status data indicating a status of the interchangeable lens 200 (S18). The lens status data includes, for example, information of zoom magnification of the zoom lens 210, information of position of the focus lens 230, and information of aperture value. In response to the request, the lens controller 240 sends back the requested lens status data to the camera controller 140 (519).

In this status, the camera system 1 can operate in a control mode in which an image represented by image data generated by the CCD image sensor 110 is displayed on the LCD monitor 120 as a through image. This control mode is called "live view mode". In the live view mode, a through image, which is a moving image, is displayed on the liquid crystal monitor 120 so that the user can determine composition for imaging a still image while viewing the LCD monitor 120. For the method of an autofocus operation in the live view mode, a contrast method is generally used. This is because in the live view mode, image data is steadily generated by the CCD image sensor 110, and thus it is easy to perform a contrast autofocus operation using the generated image data.

When performing an autofocus operation in a contrast method, the camera controller 140 requests the lens controller 240 for data for contrast AF (S20). The data for contrast AF is data required for performing an autofocus operation in a contrast method, and includes, for example, a focus drive speed, the amount of focus shift, an image magnification, and information indicating whether contrast AF can be performed.

1-2-2. Contrast Autofocus Operation

Next, an autofocus operation of the camera system 1 after the completion of imaging preparation will be described. Here, an autofocus operation in a contrast method (hereinafter, referred to as a "contrast AF operation") will be described.

Figure 3:
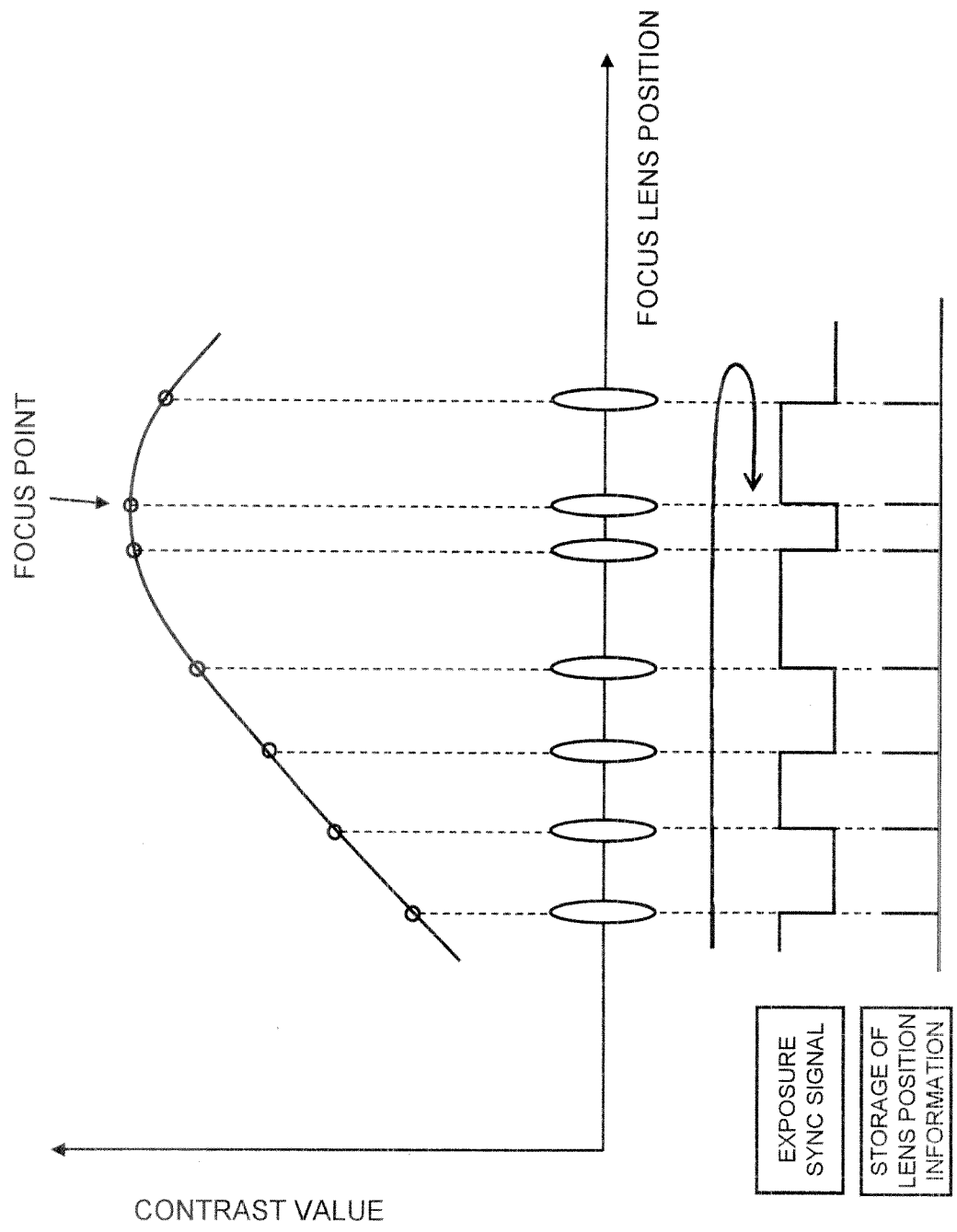
FIG. 3 is an explanatory diagram for describing a contrast AF operation.

FIG. 3 is a diagram explaining the movement of a focus lens when a contrast AF operation of the camera system 1 according to the present embodiment is performed. As shown in the diagram, when the lens is moved from a position away from a focus position, the contrast value of an image becomes higher as the lens comes closer to the focus position, and reaches a maximum at the focus position. In the contrast AF operation according to the present embodiment, while the focus lens is continuously moved without being stopped, an image is captured at a timing that synchronizes with an edge change of an exposure synchronizing signal and position information of the focus lens at the timing is obtained. Then, a contrast value is obtained for each captured image. A position of the focus lens at which the contrast value reaches a maximum is obtained and then the position is determined to be a focus position. As shown in FIG. 3, a path of contrast values obtained when the focus lens is moved from a position away from a focus position toward the focus position represents a mountain shape. In the following description, an operation of causing the focus lens to move from a position away from a focus position toward the focus position is called "mountain-climbing (M/C)".

Figure 4:
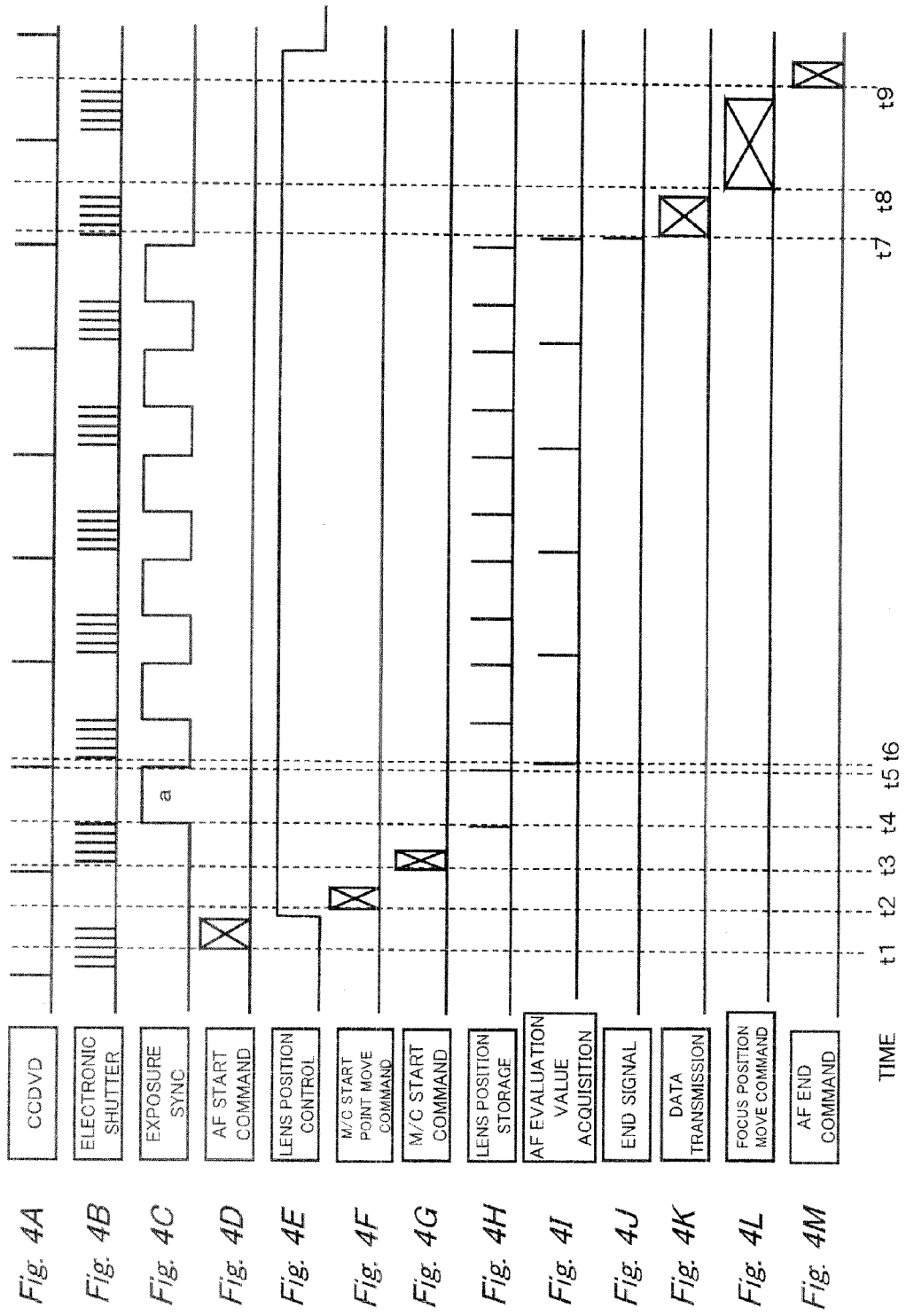
FIGS. 4A to 4M are timing charts for a contrast AF operation performed by a camera system according to a first embodiment of the invention.

FIGS. 4A to 4M are timing charts when performing an autofocus operation according to the present embodiment. In FIGS. 4A to 4M, it is assumed that the camera controller 140 operates in the live view mode. As shown in FIG. 4A, the camera controller 140 periodically generates a vertical synchronizing signal (CCDVD). The camera controller 140 generates, as shown in FIG. 4C, an exposure synchronizing signal from a predetermined time based on an electronic shutter driving signal and the vertical synchronizing signal. The camera controller 140 grasps in advance exposure start timing and exposure end timing with respect to the vertical synchronizing signal, and thus, can generate an exposure synchronizing signal.

The camera controller 140 outputs the vertical synchronizing signal to the timing generator 112 and transmits the exposure synchronizing signal to the lens controller 240. Specifically, the camera controller 140 generates a timing signal at timing correlated with timing of the exposure and transmits the generated timing signal to the interchangeable lens 200 through the body mount 150. Here, the timing signal corresponds to a rising edge and a falling edge of the exposure synchronizing signal. The lens controller 240 obtains position information of the focus lens 230 for a contrast autofocus operation, in synchronization with the received exposure synchronizing signal. Specifically, the lens controller 240 obtains a position of the focus lens 230 at timing of a rising edge and a falling edge of the received exposure synchronizing signal to store the obtained position in the DRAM 241 (see FIG. 3).

The timing generator 112 periodically generates an electronic shutter drive driving signal (see FIG. 4B) based on the vertical synchronizing signal, and drives CCD image sensor 110 based on the vertical synchronizing signal and the electronic shutter drive signal.

The CCD image sensor 110 performs an electronic shutter operation according to the electronic shutter drive signal (see FIG. 4B). The electronic shutter operation causes the CCD image sensor 110 to sweep out unnecessary charges externally.

The CCD image sensor 110 sweeps out charges by the electronic shutter drive signal and reads pixel data to the vertical transferring unit (not shown) by a read signal. That is, during a period from the last one of electronic shutter drive signals to a vertical synchronizing signal, an exposure operation is performed for image data for a through image. The exposure synchronizing signal is a signal indicating an exposure period, going up at a timing the edge of the last electronic shutter goes up and going down at a timing the edge of the vertical synchronizing signal goes up.

1-2-2-1. Processing Flow

Figure 5:
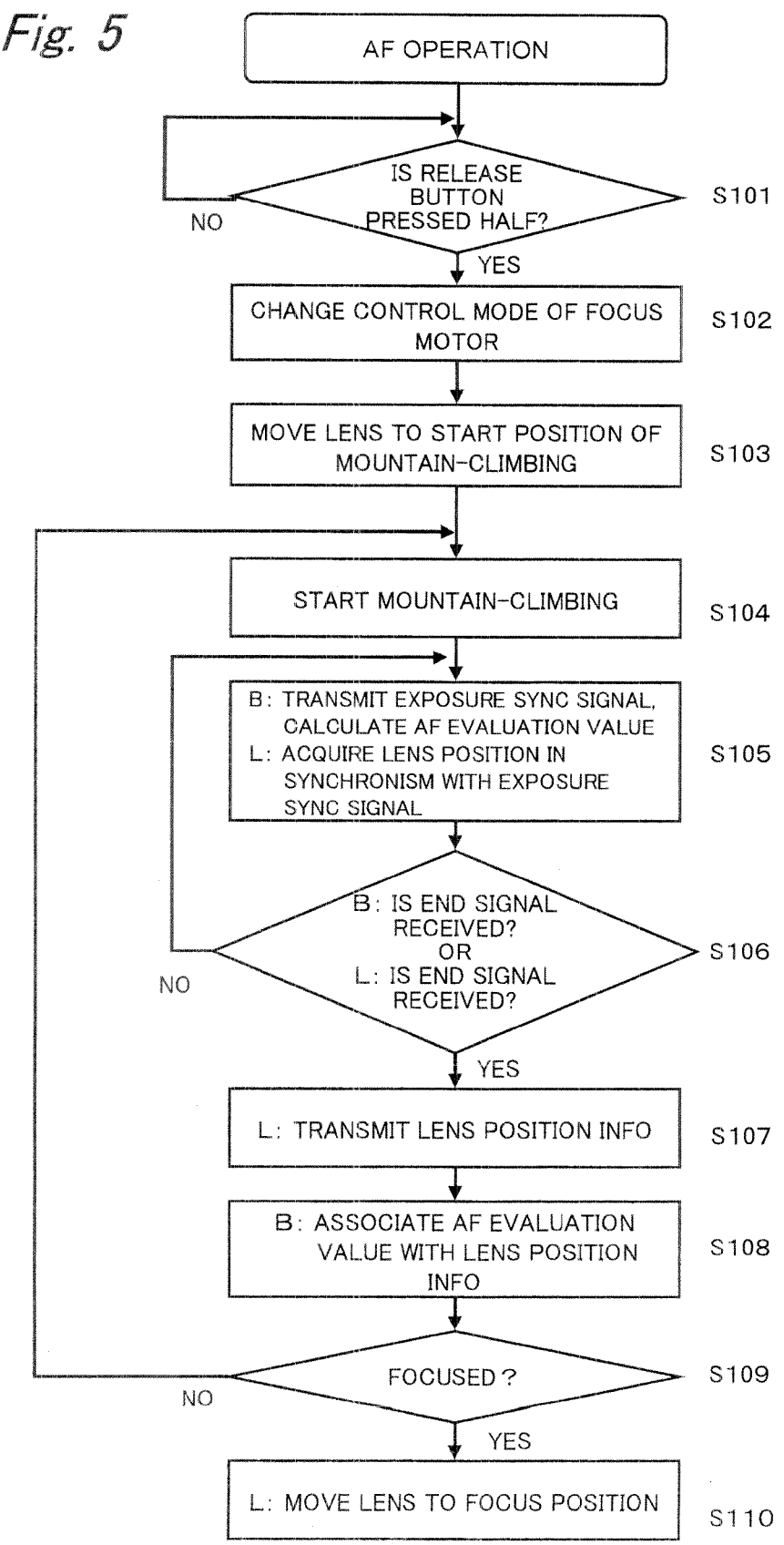
FIG. 5 is a flowchart of a contrast AF operation performed by the camera system according to the first embodiment of the invention.

The flow of a contrast AF operation of the camera system 1 according to the first embodiment will be described with reference to a flowchart in FIG. 5.

The camera controller 140 monitors whether the release button 130 has been half-pressed (S101). For example, in FIGS. 4A to 4M, when the release button 130 is half-pressed at time t1, the camera controller 140 transmits an AF start command to the lens controller 240, as shown in FIG. 4D. The AF start command is a command for instructing the start of an autofocus operation in a contrast method.

In response to this command, the lens controller 240 changes the control mode of the focus motor 233 from the first control mode to the second control mode (S102). In FIG. 4E, a period of "Low" is a period of the first control mode, while a period of "High" is a period of the second control mode. Then, the lens controller 240 stores in the DRAM 241 a value (the number of pulses) of the counter 243 when the control mode is changed to the second control mode. Subsequently, the lens controller 240 controls the focus motor 233 with reference to the value.

The reason why the control mode is changed from the first control mode to the second control is that the second control mode is relatively superior to the first control mode in the accuracy of detection of a reversal of the driving direction of the focus lens 230 that is not intended by the lens controller 240.

Thereafter, the camera controller 140 transmits, at time t2, a mountain-climbing (M/C) start point move command to the lens controller 240. In the example of FIGS. 4A to 4M, at time t2, the mountain-climbing start point move command is transmitted. This command is a command indicating a position to which the focus lens 230 is moved at the time of the start of a contrast AF operation and a moving direction of the focus lens 230 during detection of an AF evaluation value. In response to this, the lens controller 240 controls the focus motor 233. The focus motor 233 causes the focus lens 230 to move to a position indicated by the mountain-climbing start point move command, under the control of the lens controller 240 (S103).

Then, the camera controller 140 transmits a mountain-climbing (M/C) start command to the lens controller 240 (S104). In the example of FIGS. 4A to 4M, at time t3, the mountain-climbing start command is transmitted. The lens controller 240 drives the focus motor 233 in the second control mode, as shown in FIG. 4E, in response to an instruction from the camera controller 140.

After the transmission of the mountain-climbing start command, as shown in FIG. 4C, the camera controller 140 transmits an exposure synchronizing signal to the lens controller 240 (S105). Specifically, the exposure synchronizing signal is transmitted from the camera controller 140 to the lens controller 240 in synchronization with an exposure period from the first exposure timing after the transmission of the mountain-climb start command. By thus transmitting the exposure synchronizing signal after the transmission of the mountain-climbing start command, it can be avoided to transmit simultaneously the mountain-climbing start command and the exposure synchronizing signal. By this, the risk of losing information due to a collision between the mountain-climbing start command and the exposure synchronizing signal can be reduced.

The lens controller 240 sequentially stores, in the DRAM 241, the number of pulses of the counter 243 obtained when the exposure synchronizing signal is switched from off to on or from on to off (S105). The number of pulses of the counter 243 is information indicating a position of the focus lens 230. The lens controller 240 stores position information of the focus lens 230 in the DRAM 241 in synchronization with switching of an edge of the exposure synchronizing signal (see FIG. 3).

The CCD image sensor 110 is exposed during an exposure period and transmits generated image data to the camera controller 140 through the AD converter 111. The camera controller 140 calculates an evaluation value for an autofocus operation (hereinafter, referred to as an "AF evaluation value"), based on the received image data (S105). For an AF evaluation value calculation method, it is known that luminance signals are obtained from image data generated by the CCD image sensor 110 and high frequency components of the luminance signals in the image are added up, so that an AF evaluation value is obtained. The calculated AF evaluation value is stored in the DRAM 141 in which the calculated AF evaluation value is associated with the exposure synchronizing signal.

After the exposure synchronizing signal is transmitted from the camera controller 140 to the lens controller 240 and the position information of the focus lens 230 is stored in the DRAM 241 by the lens controller 240 and the camera controller 140 calculates the AF evaluation value of the image data obtained from the CCD image sensor 110, the camera controller 140 and the lens controller 240 each determine whether one of them has received an end signal from the other of them (S106). The end signal is a signal for terminating the communication for lens position detection between the camera controller 140 and the lens controller 240.

Below, timing at which each of the camera controller 140 and the lens controller 240 transmits an end signal, i.e., condition of canceling a lens position detection, will be described.

The camera controller 140 can transmit an end signal to the lens controller 240, when, for example, a calculated AF evaluation value goes over a mountain of mountain-climbing and a focus position is found. Alternatively, the camera controller 140 may transmit an end signal to the lens controller 240, when a user performs a playback operation of image data stored in the memory card 171 or a shooting-mode end operation, such as turning off power of the camera system 1.

The lens controller 240 transmits an end signal to the camera controller 140, when, for example, the focus lens 230 reaches a far limit or near limit. With this arrangement, when the focus lens 230 can no longer be driven, the camera controller 140 stops calculation of an AF evaluation value. As a result, the possibility that the camera controller 140 makes an erroneous focus determination based on a nonsense AF evaluation value can be reduced.

Alternatively, the lens controller 240 may transmit an end signal to the camera controller 140, when the DRAM 241 runs short of its free space and thus no more number of pulses of the counter 243 can be stored. In this configuration, driving of the focus lens 230 stops when the DRAM 241 runs short of its free space. A case can be avoided, in which lens position information for the AF evaluation value cannot be obtained despite the fact that the camera body 100 obtains an AF evaluation value of image data. When the DRAM 241 has shortage of free space, the position information stored in the DRAM 241 may be transmitted immediately, resulting in free space in the DRAM 241. This allows the lens position information to be stored continuously without stopping the lens drive.

For example, when the zoom lens 210 is moving or when relatively large motion such as camera shake occurs in the camera system 1, the camera controller 140 does not need to calculate an AF evaluation value. The reason is as follows. In this case, the angle of view or a shooting range changes. Thus, even if AF evaluation value is calculated, the calculated AF evaluation value is not so useful when performing an autofocus operation after the angle of view or the imaging range is stabilized. Accordingly, when the lens controller 240 detects that the angle of view or the shooting range of an imaged image is relatively largely changed, the lens controller 240 may transmit an end signal to the camera controller 140. By this, unnecessary calculation of AF evaluation value by the camera controller 140 is lessened.

As such, in the camera system 1, end signal can be transmitted from both the camera body 100 and the interchangeable lens 200. With this configuration, the camera system 1 can perform communication of position information of the focus lens 230 at optimal timing. This configuration can relatively reduce the number of communications compared to a configuration in which an AF evaluation value is transmitted to the camera controller 140 each time an AF evaluation value is calculated. As a result, the camera system 1 can implement of a relatively fast contrast AF operation.

Note that although, in the present embodiment, when communication for lens position detection between the camera body 100 and the interchangeable lens 200 ends, an end signal is transmitted from the camera body 100 or the interchangeable lens 200. However the configuration does not necessarily need to be like this. For example, when the camera body 100 stops the transmission of an exposure synchronizing signal, the interchangeable lens 200 may transmit position information to the camera body 100, so that the communication for lens position detection may end. Alternatively, by the camera body 100 stopping generation of an exposure synchronizing signal, the interchangeable lens 200 may transmit position information to the camera body 100, so that the communication for lens position detection may end. Alternatively, the communication for lens position detection may end by controlling the interchangeable lens 200 to transmit position information to the camera body 100 without transmitting the end signal.

When neither the camera controller 140 nor the lens controller 240 receives an end signal, the camera controller 140 and the lens 2C controller 240 repeat a process of calculating an AF evaluation value and obtaining lens position information (S105 to S106).

When at least one of the camera controller 140 and the lens controller 240 receives an end signal from the other of them, the lens controller 240 transmits to the camera controller 140 the number of pulses of the counter 243, i.e., position information of the focus lens 230 stored in the DRAM 241 (S107 and time t7 in FIG. 4K).

When the position information of the focus lens 230 is obtained, the camera controller 140 associates the AF evaluation value stored in the DRAM 141 with the obtained position information (S108). The associated information is stored in the DRAM 141. The AF evaluation value and the position information of the focus lens 230 are associated with the exposure synchronization signal. Hence, the camera controller 140 can store the AF evaluation value and the lens position information which is associated with the AF evaluation value. For example, an AF evaluation value which is calculated using image data exposed during period "a" in FIG. 4C is stored in DRAM 141 at time 6. Then, the calculated AF evaluation value is associated with an average value of a position of the focus lens 230 at time t4 and a position of the focus lens 230 at time t5. In such a manner, the AF evaluation value calculated using image data exposed during period "a" in FIG. 4C is stored in the DRAM 141 at time t7.

When the association of the AF evaluation value with the position information of the focus lens 230 is made, the camera controller 140 determines whether a focus position of the focus lens 230 has been extracted (S109). Specifically, a position of the focus lens 230 at which the AF evaluation value is maximum is extracted as a focus position.

When a focus position of the focus lens 230 has not been a extracted, the camera controller 140 and the lens controller 240 repeat the processing of steps S104 to S109.

When a focus position of the focus lens 230 has been extracted, the camera controller 140 transmits a focus position move command to the lens controller 240 (FIG. 4L, time t8). The focus position move command is a command indicating a moving direction and a position to which the focus lens 230 is moved. The lens controller 240 drives the focus motor 233 according to the focus position move command (S110). When the move to a focus point is completed, the camera controller 140 transmits an AF completion command to the lens controller 240 (FIG. 4M, time t9). In response to this, the lens controller 240 changes the control mode of the focus motor 233 from the second control mode back to the first control mode, as shown in FIG. 4E. In this manner, the contrast autofocus operation is completed.

As described above, in the first embodiment, when the camera controller 140 and/or the lens controller 240 receives an end signal, position information of the focus lens 230 is transmitted from the interchangeable lens 200 to the camera body 100. By this, in the camera system 1, the camera body 100 can obtain position information of the focus lens 230 at optimal timing, and can associate the obtained position information with a calculated evaluation value of image data obtained at corresponding timing. As a result, the camera system 1 can improve accuracy of a contrast autofocus operation.

Second Embodiment

The present embodiment describes another example of the contrast AF operation. The configuration and basic operation of the camera system 1 are the same as those in the first embodiment.

Figure 6:
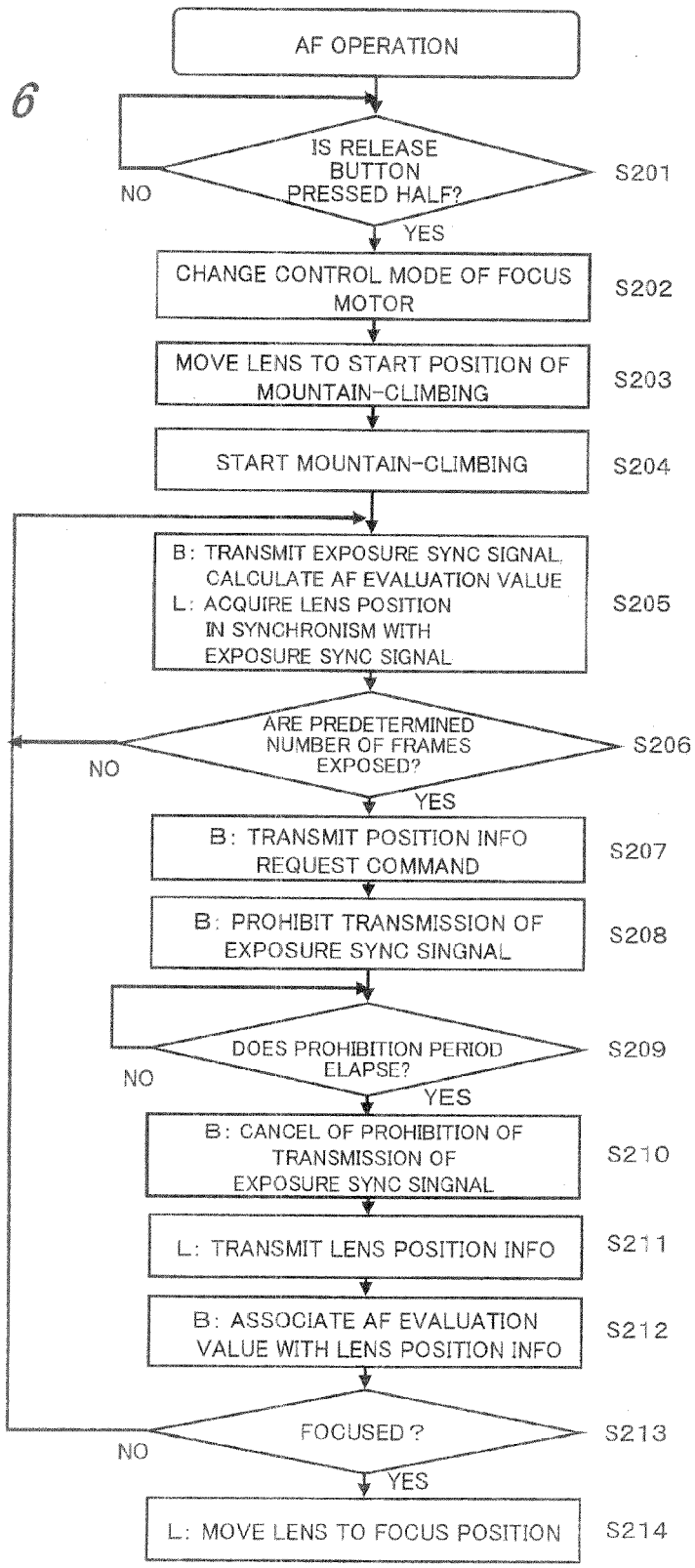
FIG. 6 is a flowchart of a contrast AD operation performed by a camera system according to a second embodiment of the invention.

FIG. 6 is a flowchart of a contrast AF operation according to the present embodiment. Steps S201 to S205 and steps S211 to S214 are respectively the same as steps S101 to S105 and steps S107 to S110 in the flowchart of FIG. 5 according to the first embodiment.

An exposure synchronizing signal is transmitted from a camera controller 140 to a lens controller 240, and position information of a focus lens 230 is stored in a DRAM 241 by the lens controller 240. An AF evaluation value of image data obtained from a CCD image sensor 110 is calculated by the camera controller 140 (S201 to S205). Then, the camera controller 140 determines whether the CCD image sensor 110 has completed exposure for a predetermined number of frames (S206). In the present embodiment, the predetermined number is two but any other number, e.g., three or four, may be used.

Until exposure for the predetermined number of frames is completed, the camera controller 140 and the lens controller 240 repeat transmission of an exposure synchronizing signal, calculation of an AF evaluation value, and acquisition of lens position information (S205 to S206).

Figure 7:
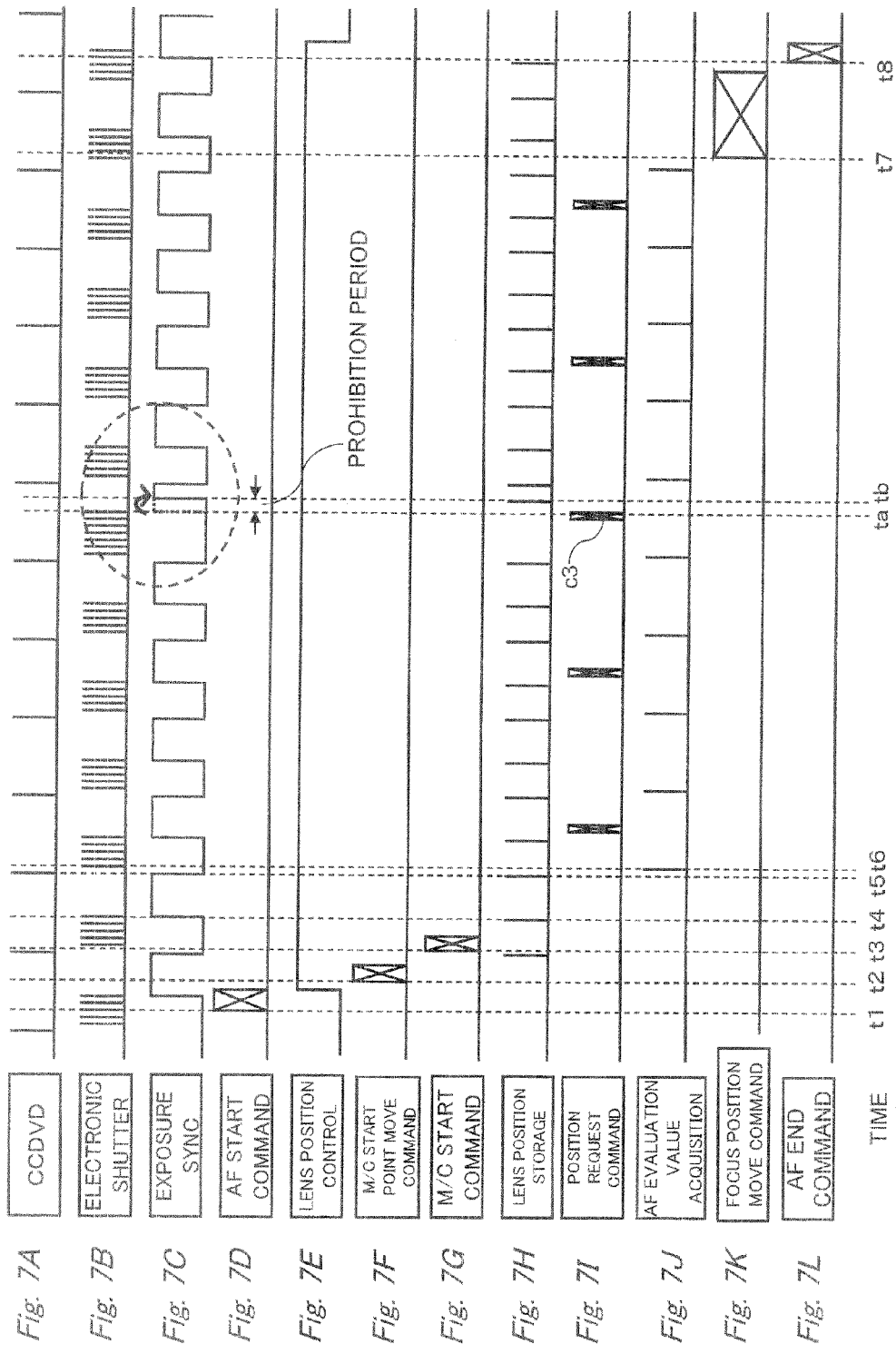
FIGS. 7A to 7L are timing charts for a contrast AF operation performed by the camera system according to the second embodiment of the invention.

When it is determined that exposure for the predetermined number of frames has been completed, the camera controller 140 transmits, to the lens controller 240, a position information request command (see FIG. 7I) that requests for lens position information stored in the DRAM 241 (S207).

As such, in the present embodiment, the camera controller 140 requests for lens position information when a predetermined number of pieces of lens position information are stored in the DRAM 241. Specifically, the camera controller 140 transmits an exposure synchronizing signal to the lens controller 240 at a first period (see FIG. 7C) and transmits a position information request command to the lens controller 240 at a second period which is longer than the first period (see FIG. 7I).

With the above-described configuration, the frequency of communicating lens position information can be reduced compared to a configuration in which lens position information is requested each time lens position information is stored in the DRAM 241. Thus, the number of frames captured by the CCD image sensor 110 per unit of time increases, and this configuration can support a case in which it is difficult to communicate lens position information each time lens position information is stored in the DRAM 241. Also, the reduction in communication frequency can reduce burden of the camera controller 140 so that ability of the camera controller can also be assigned to the other function.

Also, by the above-described configuration, the camera controller 140 can obtain lens position information more frequently compared to a configuration in which the camera controller 140 requests for lens position information only after a focus position is detected. As a result, even when an operation by which the angle of view changes, such as a zoom operation, is performed during a contrast AF operation, or even when a shooting range is changed due to relatively large motion given to the camera system 1, a focus position can be relatively easily detected.

After the transmission of the position information request command, the camera controller 140 prohibits (stops) the transmission of the exposure synchronizing signal to the lens controller 240 (S208). The reason why the transmission of the exposure synchronizing signal is thus prohibited will be described below.

The lens controller 240 obtains position information of the focus lens 230 in synchronization with an edge change of the exposure synchronizing signal transmitted from the camera controller 140 and stores the position information in the CRAM 241. Then, when the lens controller 240 receives a position information request command from the camera controller 140, the lens controller 240 transmits to the camera controller 140 lens position information for two frames having been stored in the DRAM 241 up to that point. In such control, when an edge of the exposure synchronizing signal is changed during the transmission of a position information request command, the lens controller 240 obtains lens position information during the transmission of the position information request command and stores the lens position information in the DRAM 241. Then, the lens controller 240 transmits, to the camera controller 140, not only four pieces of lens position information for two frames already stored in the DRAM 241 as a response to the position information request command before receiving the position information request command, but also the lens position information obtained during the transmission of the position information request command. Although the camera controller 140 essentially expects to obtain four pieces of lens position information for two frames that are exposed immediately before the transmission of the position information request command, the camera controller 140 actually obtains six pieces of lens position information. This causes a problem that an association of lens position information with an AF evaluation value cannot be made. To avoid such a problem, in the present embodiment, transmission of an exposure synchronizing signal to the lens controller 240 is prohibited for a predetermined period after the transmission of a position information request command so that the timing of an edge change of an exposure synchronizing signal does not overlap the transmission timing of a position information request command.

After the prohibition of the transmission of an exposure synchronizing signal, the camera controller 140 determines whether a predetermined prohibition period has elapsed (S209). The prohibition period will be described below.

Figure 8:
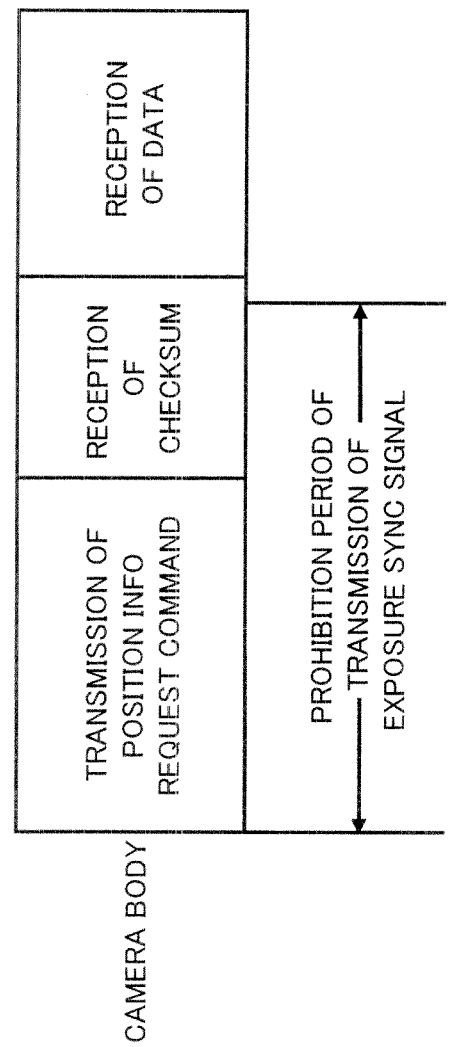
FIG. 8 is a diagram for describing an example of a transmission prohibition period of an exposure synchronizing (sync) signal.

FIG. 8 is a diagram describing the prohibition period. After a period of transmitting a position information request command by the camera controller 140, a period required for receiving a checksum and a period required for receiving data by the camera controller follow. During the period of transmitting position information request command, the camera controller 140 transmits a position information request command to the lens controller 240. During the period of receiving a checksum, the lens controller 240 considers the transmitted command to be a numeric string, calculates the sum of numeric values of the numeric string (checksum), and transmits the sum to the camera controller 140. The camera controller 140 considers the obtained command to be a numeric string, calculates the sum of numeric values of the numeric string, and compares the sum of numeric values calculated by itself with the numeric value received from the lens controller 240. If they match, then the communication is determined to be successful. If they do not match, then the communication is determined to be failed. During the period of receiving data, the camera controller 140 obtains lens position information stored in the DRAM 241 from the lens controller 240.

In the present embodiment, during the period of transmitting position information request command and the period of receiving a checksum out of these periods, the camera controller 140 prohibits (stops) the transmission of an exposure synchronizing signal to the lens controller 240. That is, the prohibition period at step S209 during which the transmission of an exposure synchronizing signal is prohibited is set to at least a period obtained by summing the period of transmitting position information request command and the period of receiving a checksum.

By such a configuration, the lens controller 240 can be prevented from simultaneously receiving an exposure synchronizing signal and a position information request command from the camera controller 140. As a result, the lens controller 240 can exclusively perform a lens position detection process, and the like, upon reception of an exposure synchronizing signal and a lens position information transmission process upon reception of a position information request command. Also, a risk of losing either of an exposure synchronizing signal and a position information request command due to simultaneous reception thereof can be reduced.

Returning to FIG. 6, after the prohibition of the transmission of an exposure synchronizing signal (S208), when the prohibition period has elapsed, the camera controller 140 cancels the prohibition of the transmission of an exposure synchronizing signal (S210). By this, the transmission of an exposure synchronizing signal is enabled. It is to be noted that the prohibition (stopping) of the transmission of an exposure synchronizing signal means to prohibit switching an exposure synchronizing signal from high to low or from low to high and that the cancellation of the prohibition of the transmission of an exposure synchronizing signal means to allow switching an exposure synchronizing signal from high to low or from low to high. For example, for the exposure synchronizing signal shown in FIG. 7C, the exposure synchronizing signal is essentially suppose to rise to "high" at time ta. However, time ta is a time immediately after the transmission of the third position information request command C3, and the predetermined period has not elapsed since the transmission of the position information request command C3. Therefore, at time ta, the exposure synchronizing signal is not switched, and the exposure synchronizing signal is switched to "high" at time tb after waiting for the prohibition period to elapse.

Then, the lens controller 240 transmits position information of the focus lens 230 to the camera controller 140 (S211). In the present embodiment, the camera controller 140 transmits a position information request command each time the CCD image sensor 110 captures two frames of images. Thus, when the lens controller 240 receives a position information request command from the camera controller 140, the lens controller 240 transmits four pieces of lens position information stored in the DRAM 241. It is to be noted that, in Step S209, when the switching timing of the exposure synchronizing signal is shifted, the lens position to be associated with the AF evaluation value should be corrected in associating the lens position with the AF evaluation value in Step S212. Specifically, an actual lens position is shifted by amount corresponding to the shift amount, and then the shifted lens position is associated with the AF evaluation value.

Thereafter, similar to the first embodiment, an association of an AF evaluation value and the lens position information is made (step S212). Then, steps S205 to S213 are repeated until a focus position of the focus lens 230 can be extracted, and finally the focus lens 230 is moved to the focus position (S214).

As described above, in the present embodiment, by providing an exposure synchronizing signal transmission prohibition period after the transmission of a position information request command (S207 to S209), a collision between the exposure synchronizing signal and the position information request command is prevented. By this, the camera controller 140 can correctly associate position information received from the lens controller 240 after the transmission of a position information request command, with a relevant AF evaluation value.

Third Embodiment

In the second embodiment, in order to prevent a collision between an exposure synchronizing signal and a position information request command, a predetermined prohibition period is provided after the transmission of a position information request command and during the prohibition period the transmission of an exposure synchronizing signal is prohibited (stopped). The present embodiment describes an example in which in order to prevent a collision between an exposure synchronizing signal and a position information request command, the transmission timing of a position information request command is shifted so that the transmission of an exposure synchronizing signal does not take place during a prohibition period. The configuration and basic operation of the camera system 1 are the same as those in the first embodiment.

Figure 9:
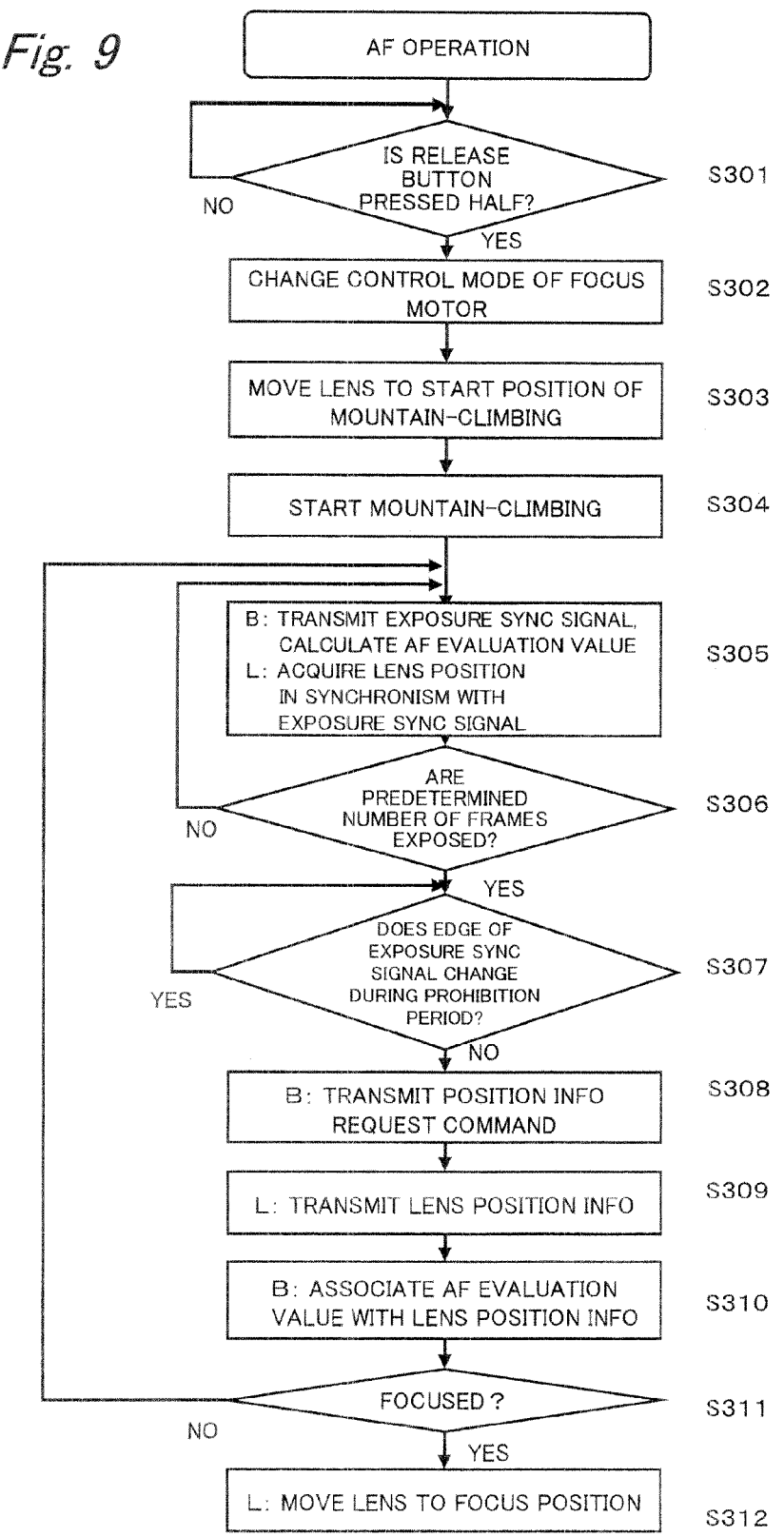
FIG. 9 is a flowchart of a contrast AF operation performed by a camera system according to a third embodiment of the invention.
Figure 10:
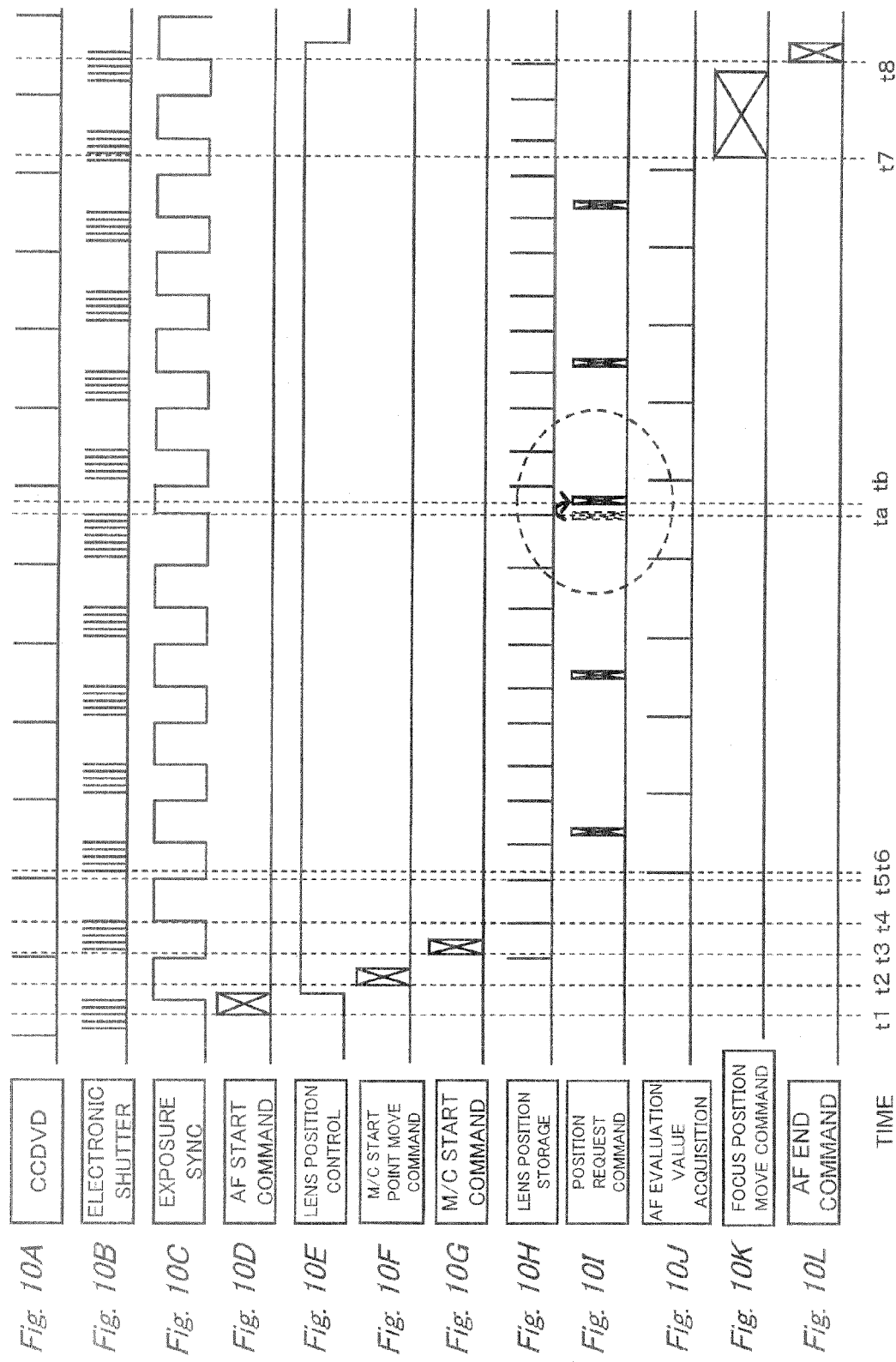
FIGS. 10A to 10L are timing charts for a contrast AF operation performed by the camera system according to the third embodiment of the invention.

FIG. 9 is a flowchart of a contrast AF operation according to the present embodiment. Steps S301 to S305 and steps S309 to S312 are respectively the same as steps S101 to S105 and steps S107 to S110 in the flowchart of FIG. 5 according to the first embodiment.

In the present embodiment, in order that a position information request command is not transmitted at timing of an edge change of an exposure synchronizing signal, the transmission timing of the position information request command is varied. Specifically, after exposure for a predetermined number of frames are completed (S306), a timing for transmitting a position information request command is determined (S307). Specifically, a camera controller 140 determines whether a prohibition period expected if a position information request command would be transmitted at that time overlaps a timing at which an edge of an exposure synchronizing signal changes (S307). If determined that they overlap, then the camera controller 140 does not transmit a position information request command. The camera controller 140 transmits a position information request command when it is determined that there is no overlap (S307 and S308). As such, control is performed such that the transmission timing of a position information request command is shifted to prevent the transmission timing of the position information request command from overlapping the timing of an edge change of an exposure synchronizing signal.

For example, in FIGS. 10A to 10L, it is assumed that a timing at which exposure for the predetermined number of frames is completed is time ta. As shown in FIG. 105, at time ta, the exposure synchronizing signal rises up. Hence, the camera controller 140 determines that the transmission timing of a position information request command overlaps the timing of an edge change of the exposure synchronizing signal. Thus, the camera controller 140 does not transmit a position information request command at time ta. By this, as shown in FIG. 101, the transmission of a position information request command is delayed to time tb, so that a collision between an edge of the exposure synchronizing signal and the position information request command is avoided.

Fourth Embodiment

The present embodiment shows still another configuration for preventing a collision between an exposure synchronizing signal and a position information request command. The configuration and basic operation of the camera system 1 are the same as those in the first embodiment.

In the present embodiment, in order that an exposure synchronizing signal and a position information request command do not collide with each other, the position information request command is transmitted at predetermined timing. Specifically, timing of a position information request command is set such that timing at which an edge of an exposure synchronizing signal changes does not overlap a position information request command transmission prohibition period. For example, an exposure synchronizing signal may be controlled so that an edge of the exposure synchronizing signal is not changed during a predetermined period of one frame period, and a position information request command may be controlled to be transmitted during the predetermined period.

Figure 11:
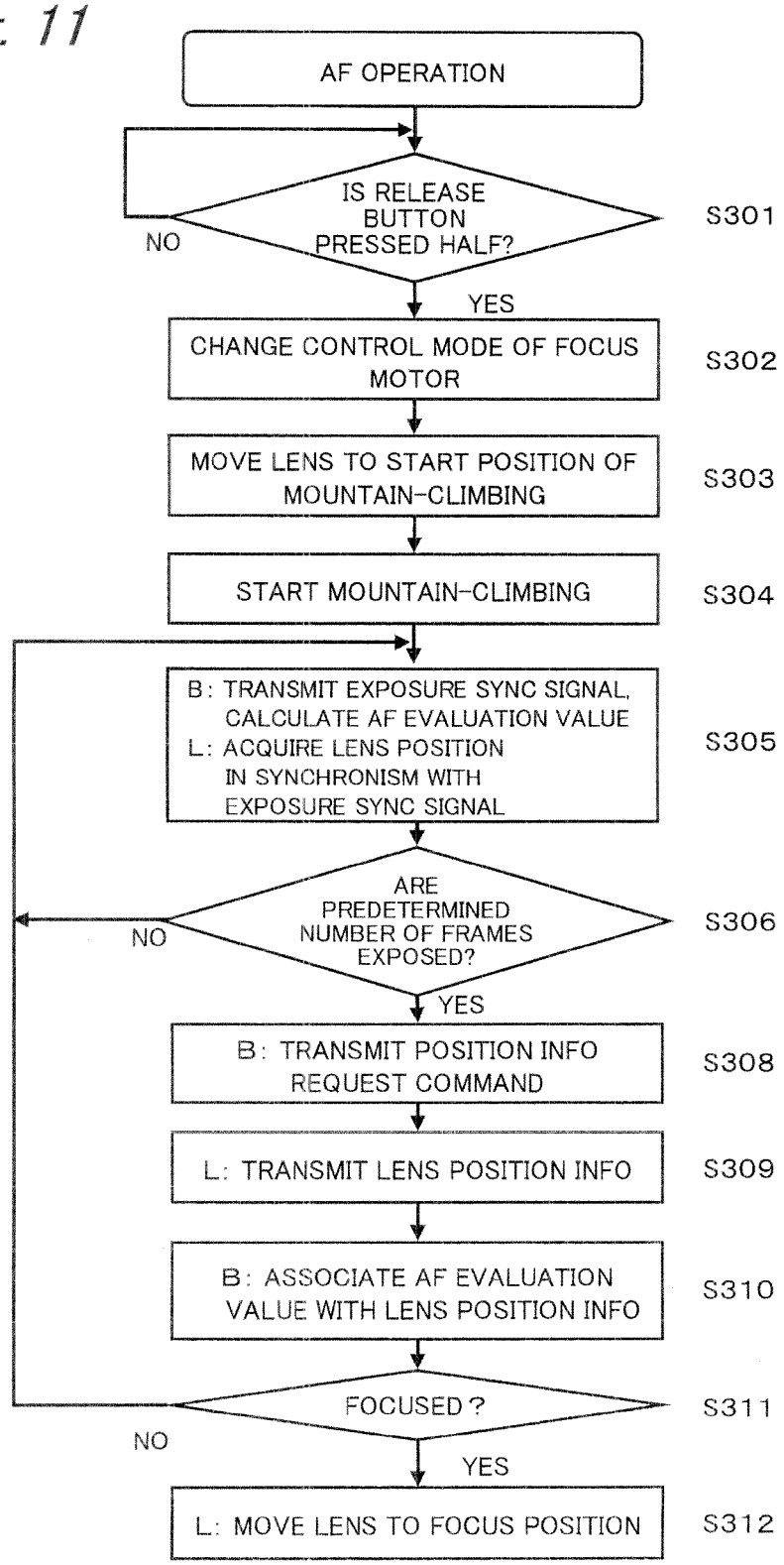
FIG. 11 is a flowchart of a contrast AF operation performed by a camera system according to a fourth embodiment of the invention.

FIG. 11 is a flowchart of a contrast AF operation according to the present embodiment. The flowchart according to the present embodiment is the same as the flowchart of FIG. 9 shown in the third embodiment with step S307 eliminated. Specifically, in the present embodiment, since an exposure synchronizing signal and a position information request command are transmitted at predetermined timing, step S307 in the flowchart of FIG. 9 in which the transmission timing of a position information request command is shifted can be eliminated.

FIG. 12 is a timing chart of the camera system 1 according to the present embodiment. In an example of FIG. 12, a specified period immediately after the vertical synchronizing signal (CCDVD) rises up is set to a period for which an edge of an exposure synchronizing signal is not changed, and the position information request command is transmitted during the specified period. As shown in the figure, the position information request command is transmitted at predetermined timing so as not to overlap an edge of an exposure synchronizing signal.

Other Embodiments

Although the first to fourth embodiments are described above as exemplary embodiments of the present invention, the invention is not limited thereto. Examples of some other possible embodiments of the invention will be summarized in this section.

Although the above-described embodiments exemplify, as the second control mode, a control mode using the first encoder 231 and the second encoder 232, the second control mode is not limited thereto. For example, in the second control mode, one encoder and a linear position detection sensor may be used. The linear position detection sensor is, for example, a position sensor implemented by a linear resistor whose length is the same as a driving range of the focus lens 230 and a contact that moves in conjunction with the drive of the focus lens 230 while being in contact over the resistor. Namely, the second control mode should be such a control mode that is relatively superior to the first control mode the position detection accuracy of a reversal of the driving direction of the focus lens 230 that is not intended by the lens controller 240. It is not necessary to provide the first control mode, and it is enough to provide only the second control mode.

Although the above-described embodiments exemplify a configuration having the zoom lens 210 and the CIS lens 220, such lenses are not essential to the present invention. That is, the idea of the embodiments can also be applied to a camera system having mounted thereon a single-vision lens with no zoom function. The idea of the embodiments can also be applied to a camera system having mounted thereon an interchangeable lens with no camera shake correction function.

Although the above-described embodiments exemplify a camera body with no movable mirror, the invention is not limited thereto. For example, a camera body may be provided with a movable mirror or a prism for splitting a subject image. Alternatively, a movable mirror may be included in an adapter instead of in a camera body.

In the above-described embodiments, a position of the focus lens 230 is not directly detected, but indirectly detected by detecting an angle of rotation of the rotating shaft of the focus motor 233. A position of the focus lens 230 may be indirectly detected by detecting a position of a mechanism member that operates in conjunction with the focus lens 230. That is, detection can be performed in any manner as long as a position of the focus lens 230 can be identified eventually.

The above-described embodiments exemplify a camera system that does not incorporate a phase-difference detection sensor. However, a camera system may incorporate a phase-difference detection sensor so that a phase-difference autofocus operation and a contrast autofocus operation can be selectively performed. In this case, when a contrast autofocus operation is performed, the idea of the embodiments is applicable.

Although in the above-described embodiments a position of the focus lens 230 is obtained in synchronization with a timing of an edge of an exposure synchronizing signal, a position of the focus lens 230 may be obtained in synchronization with a timing shifted from a timing of an edge of an exposure synchronizing signal This is because the exact lens position can be determined with linear interpolation as long as the shift amount from the edge of the exposure synchronizing signal is recognized. Accordingly, as a timing signal of the invention, any signal can be employed as long as it correlates with the exposure synchronizing signal.

For example, a vertical synchronizing signal and electronic shutter drive signals for the CCD image sensor 110 may be transmitted to the lens controller 240 as timing signal. By this, the camera controller 140 does not need to transmit an exposure synchronizing signal, enabling to facilitate control. However, in this case, the specification of the electronic shutter drive signal (transmission intervals in one group of electronic shutter drive signals, the number of transmissions, and the like) need to be notified in advance from the camera controller 140 to the lens controller 240. According to the notified specification, the lens controller 240 reads a pulse value of the counter 243 based on the electronic shutter drive signal and the vertical synchronizing signal.

Although the above-described embodiments exemplify the CCD image sensor 110 as an imaging element, the invention is not limited thereto. The imaging element may be configured by a CMOS image sensor or an NMOS image sensor.

Although specified embodiments of the present invention are described above, many other modifications, corrections and applications apparent to those skilled in the art. Therefore, the present invention is not limited by the disclosure provided herein. The present disclosure relates to subject matter contained in Japanese Patent Application Nos. 2008-086079, 2008-086080, and 2008-086081 filed on Mar. 28, 2009, which are expressly incorporated herein by reference in its entirety.

Industrial Applicability

The present invention can be applied to lens-interchangeable camera systems. Specifically, it can be applied to digital still cameras, digital movie cameras, and the like.

The invention claimed is:

1. A camera system comprising an interchangeable lens and a camera body,
    the interchangeable lens comprising:
    a focus lens moving back and forth in an optical axis direction to change a focus status of a subject image;
    a driver driving the focus lens;
    a position detector detecting a position of the focus lens;
    a storage unit storing position information on the detected position of the focus lens;
    a position information transmission unit transmitting the position information stored in the storage unit to the camera body; and
    a lens controller controlling an operation of the interchangeable lens based on control signals received from the camera body,
    the camera body comprising:
    an imaging unit imaging a subject by exposure to generate image data;
    a timing signal transmission unit generating a timing signal at a timing correlated with a timing of the exposure of the imaging unit, and transmit the timing signal to the interchangeable lens;
    a drive signal transmission unit generating a drive signal for driving the focus lens and transmit the drive signal to the interchangeable lens;
    a position information request transmission unit generating a position information request signal for requesting a transmission of position information stored in the storage unit of the interchangeable lens and transmit the position information request signal to the interchangeable lens; and
    a body controller controlling an operation of the camera body, wherein the body controller controls the drive signal transmission unit to drive the focus lens in a predetermined direction along the optical axis, and performs control to transmit the timing signal to the interchangeable lens,
    wherein the lens controller performs control to detect a position of the focus lens in synchronization with the timing signal received from the camera body and store information on the detected position in the storage unit,
    wherein the lens controller, when receiving the position information request signal from the camera body, performs control to transmit the position information stored in the storage unit to the camera body, and
    wherein the body controller performs control so that a timing of transmission of the position information request signal does not overlap a timing of transmission of the timing signal.

2. The camera system according to claim 1, wherein the body controller controls the position information request transmission unit and the timing signal transmission unit such that the timing signal is not transmitted until a predetermined period elapses from a start of the transmission of the position information request signal.

3. The camera system according to claim 2, wherein the predetermined period includes a period required for transmitting a command for requesting transmission of the position information stored in the storage unit, and a period required for transmitting a checksum of the command.

4. The camera system according to claim 2, wherein the body controller controls the position information request transmission unit to adjust the transmission timing of the position information request signal so that the transmission timing of the timing signal does not overlap the period until a predetermined period elapses from start of the transmission of the position information request signal.

5. The camera system according to claim 1, wherein
the camera body further includes a calculation unit operable to calculate an evaluation value used for an autofocus operation based on the image data generated by the imaging unit, and
the body controller associates the position information obtained from the lens controller with the evaluation value, and controls the autofocus operation of the camera system based on the associated position information and the evaluation value.

6. The camera system according to claim 5, wherein the evaluation value is calculated based on a contrast of the image data.

7. The camera system according to claim 1, wherein
the lens controller transmits the position information stored in the storage unit all at once to the camera body when receiving the position information request signal from the camera body.

* * * * *